(No Model.)
W. N. SNOW.
VEHICLE SPRING.
No. 549,030. Patented Oct. 29, 1895.
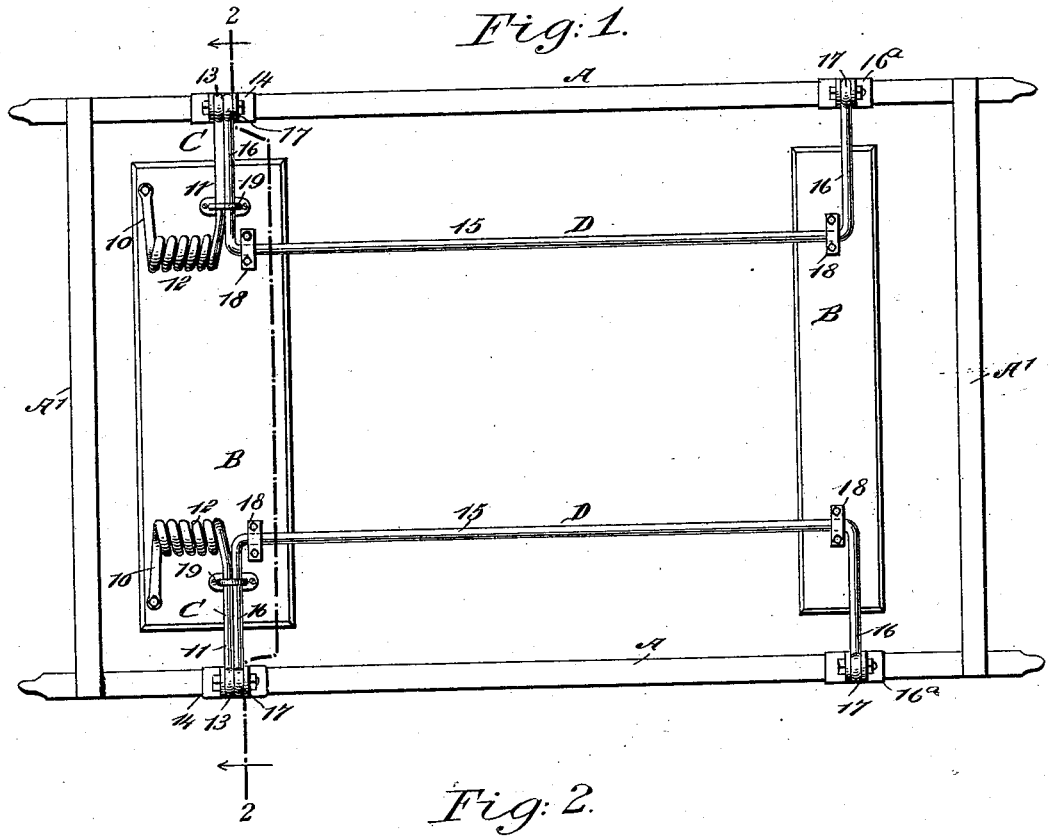
Fig. 1.
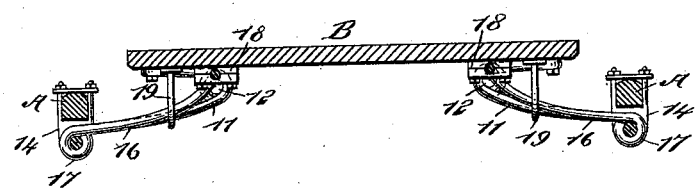
Fig. 2.
Fig. 3.
WITNESSES:
John A. Rennie
Fred Acker
INVENTOR
W. N. Snow
BY Munn & Co.
ATTORNEYS.

UNITED STATES PATENT OFFICE.

WILLIE N. SNOW, OF EATON, NEW HAMPSHIRE.

VEHICLE-SPRING.

SPECIFICATION forming part of Letters Patent No. 549,030, dated October 29, 1895.

Application filed January 14, 1895. Serial No. 534,849. (No model.)

*To all whom it may concern:*

Be it known that I, WILLIE N. SNOW, of Eaton, (Snowville,) county of Carroll, and State of New Hampshire, have invented a new and useful Improvement in Vehicle-Springs, of which the following is a full, clear, and exact description.

My invention relates to an improvement in vehicle-springs; and the object of the invention is to provide a perfect equalizing-spring to be used between the body and side bars or between bolsters and axles of a vehicle.

The invention consists in the novel construction and combination of the several parts, as will be hereinafter fully set forth, and pointed out in the claim.

Reference is to be had to the accompanying drawings, forming a part of this specification, in which similar figures and letters of reference indicate corresponding parts in all the views.

Figure 1 is a bottom plan view of the improved vehicle-spring, illustrating its application to a sleigh or other vehicle that requires all or the greater part of its load to be carried by the rear or one spring. Fig. 2 is a transverse section taken practically on the line 2 2 of Fig. 1, and Fig. 3 is a detail perspective view of one of the springs.

In carrying out the invention, A A represent the side bars, A' A' end bars connecting the same, and B the bolsters or spring-blocks of a vehicle. The spring C employed is shown in detail in Fig. 3 and comprises a short leg 10, a longer leg 11, and a body 12, consisting of a coil connecting the two legs, the longer leg being provided at its extremity with an eye 13.

Shackles 14 are clipped on the side bars A where the springs C are to be attached. In connection with each spring I employ an equalizing-frame D, which consists of a body-bar 15 and arms 16, which extend at an angle (preferably a right angle) from the ends of the body-bar. The arms 16 are either attached securely to the body-bar or may constitute an integral portion thereof, and each arm at its free or outer end is made to terminate in an eye 17.

An equalizing-frame D is located near each side bar A, and the body-bar of each equalizing-frame is journaled in bearings 18, secured upon the said bolsters B. The springs C are shown as attached to the rear bolster B by passing bolts or their equivalents through the shorter legs 10 of the springs, the longer legs of the said springs being carried into the shackles 14, as are likewise the rear arms of the equalizing-frames D, and these arms and the longer legs of the springs are pivoted in the same shackles by means of a suitable pivot-pin. The legs of the springs adjacent to the arms are kept together and made to act in unison by being passed through yokes or stirrups 19, attached to the said rear bolster. The forward arms of the equalizing-frames D are pivoted in shackles 16ª, clipped on the side bars.

In vehicles where two springs are required, as in an ordinary carriage, springs C will be located upon the forward as well as the rear bolster, and I desire it to be distinctly understood that the equalizing-frame may be attached in the same manner as any kind of spring made after the Timpkins patent as well as the coiled spring illustrated.

The improved spring being constructed and secured substantially as described, when a weight is placed upon the body of the vehicle the spring or springs at once yield to the weight or pressure with elastic resistance, and being thus rigidly attached to the equalizing-frames both ends of the vehicle will be brought down in unison through the medium of said frames, the body remaining at all times parallel with the side bars or axle.

The equalizing-frames may extend lengthwise of the vehicle-body, as shown, so as to keep the sides of said body parallel with the side bars, or they may be made to extend crosswise of the body of the vehicle, so as to maintain the ends of the vehicle parallel with its axles.

Having thus described my invention, I claim as new and desire to secure by Letters Patent—

The combination with the bolsters and side bars of a vehicle, of the coiled springs having their ends extended outward and having the axes of their coil portions substantially parallel with the side bars, one end of each spring being rigidly attached to a bolster and the other ends having pivotal connection with the side bars, the equalizing frame journaled on the bolsters and having outwardly extended arms pivotally connected to the side bars, and the yokes or stirrups on the bolster respectively embracing one arm of the equalizing frame and the adjacent end of the spring, substantially as described.

WILLIE N. SNOW.

Witnesses:
   FRED A. CHELLIS,
   EVERETT A. STANLEY.